United States Patent
Abernathy et al.

(10) Patent No.: US 10,033,557 B2
(45) Date of Patent: Jul. 24, 2018

(54) ISOLATED DIGITAL VIDEO INTERFACE RECEIVER AND METHOD FOR ISOLATING RECEIVED DIGITAL VIDEO INTERFACE SIGNALS

(71) Applicant: L-3 COMMUNICATIONS CORPORATION, New York, NY (US)

(72) Inventors: Michael G. Abernathy, Ellijay, GA (US); Nathaniel Flournoy Lovelace, III, Marietta, GA (US)

(73) Assignee: L-3 COMMUNICATIONS CORPORATION, New York, NY (US)

(*) Notice: Subject to any disclaimer, the term of this patent is extended or adjusted under 35 U.S.C. 154(b) by 0 days.

(21) Appl. No.: 15/091,960

(22) Filed: Apr. 6, 2016

(65) Prior Publication Data
US 2017/0295043 A1    Oct. 12, 2017

(51) Int. Cl.
*H04L 25/03* (2006.01)
*H04N 21/436* (2011.01)
(Continued)

(52) U.S. Cl.
CPC ...... *H04L 25/03885* (2013.01); *G09G 5/006* (2013.01); *H04L 25/0266* (2013.01); *H04N 21/40* (2013.01); *H04N 21/41* (2013.01); *H04N 21/4104* (2013.01); *H04N 21/43* (2013.01); *H04N 21/436* (2013.01); *H04N 21/43615* (2013.01); *H04N 21/43632* (2013.01); *H04N 21/43635* (2013.01); *G09G 2330/02* (2013.01); *G09G 2330/06* (2013.01); *G09G 2370/12* (2013.01); *G09G 2380/12* (2013.01)

(58) Field of Classification Search
None
See application file for complete search history.

(56) References Cited

U.S. PATENT DOCUMENTS 5,995,348 A * 11/1999 McCartan ............ H02H 9/025
                                                361/115
8,829,479 B2    9/2014 Abernathy et al.
(Continued)

OTHER PUBLICATIONS

Kreamer, John G., Shaw, John A., Achieving EMI Compliance with DVI and HDMI on Defense / Aerospace Platforms, Electromagnetic Compatiblilty, 2009. EMC 2009. IEEE International Symposium on, IEEE, Piscatawy, NJ, USA, Aug. 17, 2009 pp. 213-218.
(Continued)

*Primary Examiner* — Justin Shepard
(74) *Attorney, Agent, or Firm* — Dickinson Wright PLLC

(57) ABSTRACT

Digital video signals are transmitted from a transmitter to a receiver via a digital video interface including shielded twisted pair cables that are surrounded by an over-braid shield. The over-braid shield is connected to a chassis ground at a transmitting end and the receiving end. An interface conveys the received signals to receiver processing circuitry. The interface is connected to an isolated ground, isolating the receiver processing circuitry. The twisted pairs are also connected to the isolated ground, such that a return current is forced back through the twisted pair cable shields rather than the over-braid shield. This reduces electromagnetic emissions and confines transients primarily to the over-braid shield.

20 Claims, 3 Drawing Sheets

(51) Int. Cl.
*H04N 21/4363* (2011.01)
*H04N 21/41* (2011.01)
*H04N 21/43* (2011.01)
*H04N 21/40* (2011.01)
*G09G 5/00* (2006.01)
*H04L 25/02* (2006.01)

(56) References Cited

U.S. PATENT DOCUMENTS

| | | | |
|---|---|---|---|
| 9,135,204 B1 | 9/2015 | Glogovsky et al. | |
| 2003/0135327 A1* | 7/2003 | Levine | G01C 21/165 |
| | | | 701/500 |
| 2008/0116943 A1 | 5/2008 | Nair | |
| 2008/0173465 A1* | 7/2008 | Nair | H01B 7/0876 |
| | | | 174/117 FF |
| 2011/0268451 A1 | 11/2011 | Groepl et al. | |
| 2011/0292295 A1* | 12/2011 | Kawai | H04B 3/143 |
| | | | 348/723 |
| 2013/0329324 A1* | 12/2013 | Tziviskos | H05K 5/0247 |
| | | | 361/56 |
| 2015/0106574 A1* | 4/2015 | Jayasena | G06F 15/7821 |
| | | | 711/154 |

OTHER PUBLICATIONS

Notification of Transmittal of the International Search Report and the Written Opinion of the International Searching Authority, or the Declaration, dated Jun. 22, 2017 for related international application PCT/US2017/026231.

\* cited by examiner

ISOLATED DIGITAL VIDEO INTERFACE RECEIVER AND METHOD FOR ISOLATING RECEIVED DIGITAL VIDEO INTERFACE SIGNALS

BACKGROUND

The Digital Visual Interface (DVI) has become very popular in the consumer electronics arena for high definition video and audio with personal computers and in-home theater systems. These interfaces are used to convey signals from a video source, such as a display controller, to a display device, such as a computer monitor, via twisted shielded cable pairs covered with an over-braid shield.

Due to the off-the-shelf availability of hardware and software that support these interfaces, DVI presents the opportunity to provide the aerospace/defense industry with high-quality, high-definition video capabilities. However, the signaling format, cable/connector system specifications, and the resulting off-the-shelf cable assemblies for DVI were designed to meet the electromagnetic interference (EMI) requirements stated in Part 15 of the Federal Communication Commission (FCC) Rules and Regulations for digital devices, as well as those applicable under the Electromagnetic Compatibility (EMC) Directive 2004/108/EC of the European Parliament. The EMI requirements for defense/aerospace equipment are much more stringent than those applicable under FCC Part 15 and the EMC Directive.

Commercial DVI standards were developed for residential applications. Such commercial DVI standards require a DC connection between the source (transmitter) and load (receiver) ground to complete the circuit. This DC connection creates a current return path from the load to the source. The cable connection between the signal ground at the transmitter and the signal ground at the receiver according to the commercial DVI standards makes such standards incompatible with aerospace applications. This ground connection is achieved through internal shields covering the individual twisted wire pairs and through an over-braid shield (described in more detail below with reference to FIG. 1). These ground connections between the transmitter and receiver represent an impedance common to the internal DVI signal current path and an external circuit path. It is through this common impedance that high-level external currents induced by lightning couple excessive voltages to the internal DVI receivers and transmitters. It is also through this path that the high frequency DVI signal currents couple small voltages and currents to the external circuit which in turn acts as an antenna radiating high frequency electromagnetic fields which may interfere with sensitive aircraft navigation, communication and other avionic systems. In a reciprocal manner, external electromagnetic fields impinging on the external circuit cause currents to flow through the impedance common to the internal DVI circuit path coupling noise voltages onto the DVI signals potentially interfering with the DVI signal reception.

A commercial DVI is not intended for aerospace applications. To act as a differential interface that does not force current in the shield requires that the collective impedance presented to each signal by the driver, receiver and wiring be identical and requires that the signal currents flowing in the wire pairs be equal magnitude and opposite polarity. If this is so, the differential signal currents flowing in the shield flow only in extremely short paths transverse to the signal wire path. On the other hand, common-mode signals cause currents to flow in the shield parallel to the signal path and usually over a much longer length. It is the common-mode currents that are primarily responsible for cable radiation. To the extent that the impedance presented to the signal wires are not balanced and the drive levels are not equal and opposite, a common-mode signal will be generated.

The standard driver of a commercial standard DVI is not exactly a balanced driver. In this aspect, the DVI deviates to some degree from the balanced output impedance characteristic of the ideal differential interface driver. Imbalances in impedance and drive currents cause high frequency common-mode currents to flow in the ground path through the cable shields in response to the DVI signals. As indicated in the above, the ground path provides a common-impedance to couple DVI signals to the external circuit path causing the radiation of high frequency electromagnetic fields.

Commercial DVI cabling uses the shields of the internal twisted pair cables connecting the transmitter and the receiver as a current return path. Commercial DVI cabling has an external over-braid shield in addition to the internal twisted shielded pairs. This over-braid shield, as well as the internal DVI shield used in the twisted pair cables, are connected to a chassis ground at both ends of the link.

A conventional DVI receiver configuration is shown in FIG. 1. Referring to FIG. 1, a conventional DVI receiver 100A includes a DVI cable equalizer 110 that receives DVI signals via inner shielded twisted pairs 200A and 200B. The inner shielded twisted pairs 200A and 200B convey DVI signals along channels 1-4 from a DVI transmitter (not shown for simplicity of illustration) to the receiver 100A. As shown in FIG. 1, for example, there are four channels of signals, each conveyed through individual shielded twisted pairs. The DVI cable equalizer 110 recovers high frequency components of the DVI signals that may have become attenuated through transmission in the twisted pairs. After being processed by the DVI cable equalizer 110, the DVI signals are conveyed to DVI receiver processing circuitry 150 for further processing for display.

The inner shielded twisted pairs 200A and 200B are connected via pin connections to the receiver 100A. The inner shielded twisted pairs 200A and 200B are surrounded by an over-braid shield 250 which may be connected to the receiver 100A via an external connector 275 including a plug which mates with a receptacle of the receiver 100A. The inner shielded twisted pairs 200A and 200B and the over-braid shield 250 are connected to a chassis signal ground 125A. The DVI cable equalizer 110 is also connected to the chassis signal ground 125A. Although not shown, the over-braid shield 250, as well as the internal twisted pairs 200A and 200B, are connected to the chassis ground at both the receiving and transmitting ends of the link. This configuration forces the DVI return currents to use both the internal twisted shielded pair return as well as the over-braid as a return path, thus creating electromagnetic emissions. Such emissions can interfere with sensitive aircraft navigation, communication and other avionic systems.

Although the emissions produced by commercial DVI configurations are low enough to comply with emission limits for consumer products, such as FCC Part 15; such emissions are not low enough to comply with emission limits established for high-performance and/or safety-critical applications, such as aerospace applications, including but not limited to the emission limits established for aerospace applications in either MIL-STD-461 or RTCA/DO-160.

Previous solutions for more stringent requirements deviate from the DVI standard by transforming the interface between the controller and the display from single ended to differential. These solutions require modification from the standard at both the transmitting and receiving ends of the link.

In addition, defense/aerospace equipment is often also subjected to transients produced on the aircraft wires and cables, e.g., when lightning strikes the aircraft vicinity. The low voltage, high-speed circuitry of the DVI transmitter and receiver are difficult to protect from damage due to lightning induced transients in the aircraft cable when both the transmitter and the receiver are referenced to the equipment chassis and the aircraft structure. The high-speed receiver inputs limit the capacitive loading and imbalance introduced by transient voltage suppressor circuitry to extremely low levels to avoid communication errors due to frequency distortion and inter-symbol interference. The present state of the art silicon avalanche diodes used to protect against the effects of transient voltages do not clamp at sufficiently low voltages and sufficiently high currents and with sufficiently low capacitive loading to protect the DVI transmitter and receiver.

There are some available transient voltage suppressing devices with low capacitance capable of protecting low energy transients, such as electrostatic discharge (ESD). However, devices capable of dissipating the energy of lightning induced transients are not currently available. Since the DVI equipment on defense/aerospace platforms is often necessary for safe flight and/or mission accomplishment, damage from an occasional transient is not acceptable.

There exists a need for a solution for a DVI interface which reduces the effects of transients due to lightning strikes and reduces emissions to an amount which meets strict aerospace requirements but does not require a redesign of the transmitting and receiving ends of the DVI link.

SUMMARY OF THE INVENTION

Briefly described, the present invention relates to a digital video interface which reduces electromagnetic emissions and minimizes the effects of transients, such as lightning. The invention presented complies with commercial DVI standards and does not require any changes to the transmitter end of the link or standard cable interface design. By creating an isolated receiver at the load end of the link and referencing this circuitry to the source or transmitting end, the DVI interface is in compliance with the commercial DVI standard. With the DVI receiver circuitry isolated from the chassis, the current return path through the over-braid shield is disconnected. This forces all the signal return current to flow through the internal twisted pair shields and eliminates signal return current flowing through the over-braid shield. This minimizes electromagnetic emissions.

In addition, by providing a cable over-braid shield connection to the equipment chassis and aircraft structure at both ends, and by isolating the DVI receiver circuits, the currents induced by transients, such as lightning, are primarily confined to the over-braid shield. This minimizes the effects of such transients on the DVI signal.

In one example form, a DVI receiver receives DVI signals transmitted from a DVI transmitter via the shielded twisted pair cables. The shielded twisted pair cables are surrounded by an over-braid shield which is connected to a chassis ground. The DVI receiver includes an interface for coupling the received DVI signals to receiver signal processing circuitry. The interface is connected to an isolated ground, thereby isolating the receiver processing circuitry. The individual shield of each twisted pair cable is also connected to the isolated ground, such that a return current is forced back through the twisted pair cable shields rather than the over-braid shield, thereby reducing electromagnetic emissions and causing transient currents to be primarily confined to the over-braid shield.

In another example form, a method for receiving DVI signals is provided. The DVI signals are received from a DVI transmitter via shielded twisted pair cables that are surrounded by an over-braid shield. The over-braid shield is connected to a chassis ground. The received DVI signals are conveyed, via an interface, to receiver signal processing circuitry. The interface is connected to an isolated ground, thereby isolating the receiver processing circuitry. The individual shields of each twisted pair cable are also connected to the isolated ground, such that a return current is forced back through the twisted pair cable shields rather than the over-braid shield, thereby reducing electromagnetic emissions and causing transient currents to be primarily confined to the over-braid shield.

BRIEF DESCRIPTION OF THE DRAWING FIGURES

DETAILED DESCRIPTION

Figure 2:
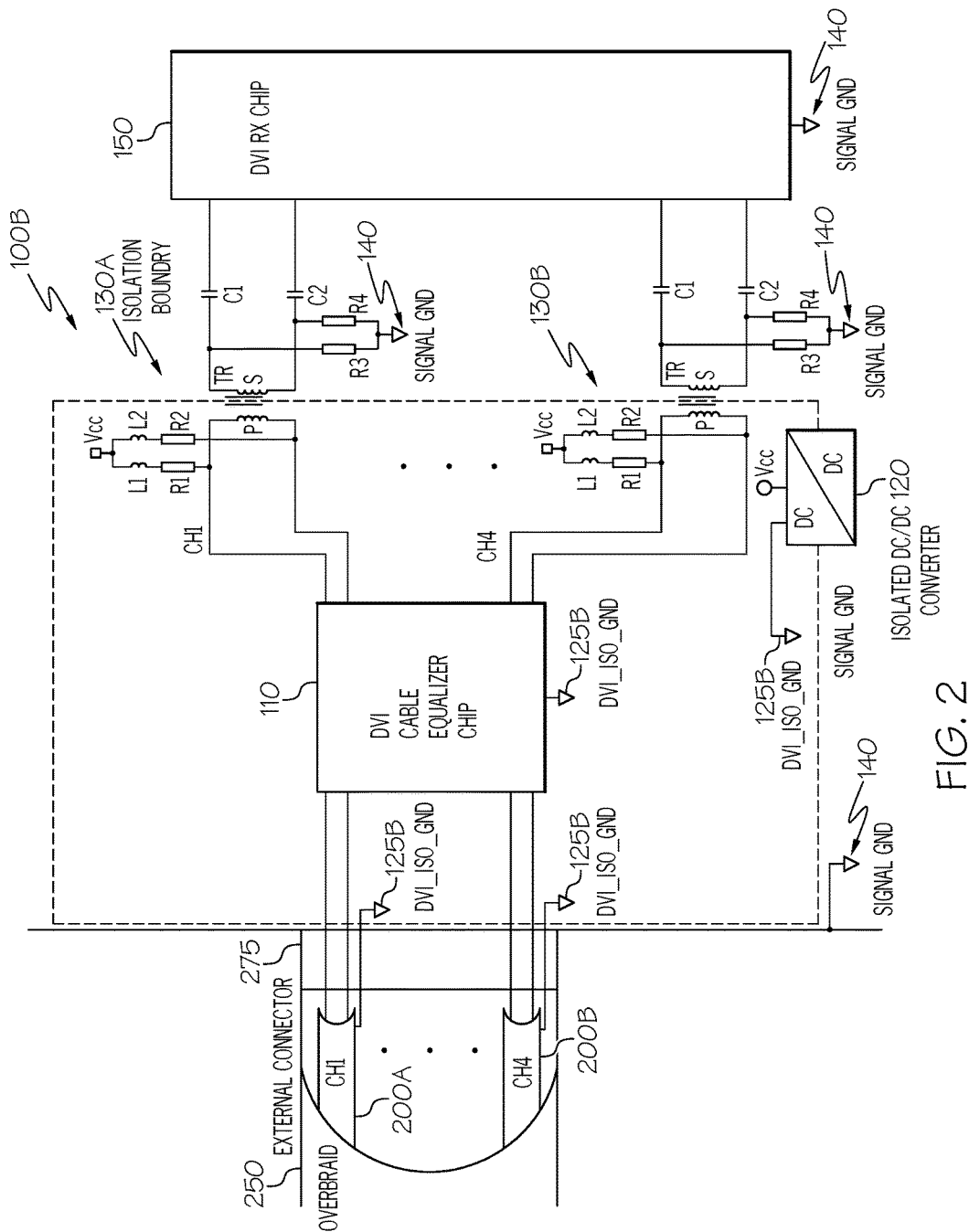
FIG. 2 illustrates a DVI receiver including an isolating interface according to an illustrative embodiment.

FIG. 2 illustrates a DVI receiver including an isolating interface according to an illustrative embodiment. Referring to FIG. 2, a DVI receiver 100B includes a DVI cable equalizer 110 that receives DVI signals via inner shielded twisted pairs 200A and 200B connected to the DVI receiver 100B via pins. The inner shielded twisted pairs 200A and 200B convey DVI signals along channels 1-4 from a DVI transmitter (not shown for simplicity of illustration) to the receiver 100B. As shown in FIG. 2, for example, there are four channels of signals, each conveyed through individual shielded pairs. The DVI cable equalizer 110 recovers high frequency components of the DVI signals that may have become attenuated through transmission in the twisted pairs.

According to an illustrative embodiment, the inner shielded twisted pairs 200A and 200B are surrounded by an over-braid shield 250 which may be connected to the receiver 100B via the external connector 275 including a plug which mates with a receptacle of the receiver 100B. As an alternative, the external connector 275 may be eliminated, and the over-braid shield 250 may be connected to receiver 100B via a cable connector plug and a mating receptacle. The over-braid shield 250 may include a conventional DVI cable over-braid shield. Alternatively, the over-braid shield may include an additional over-braid shield added over a conventional standard cable. As another alternative, a special cable arrangement may be provided in which a conventional DVI cable is not used, and an over-braid shield is applied over all other cable conductors.

The over-braid shield 250 is connected to a chassis signal ground 140. Although not shown for simplicity of illustration, this over-braid shield is connected to a chassis ground at both the receiving and transmitting ends of the link.

Figure 1:
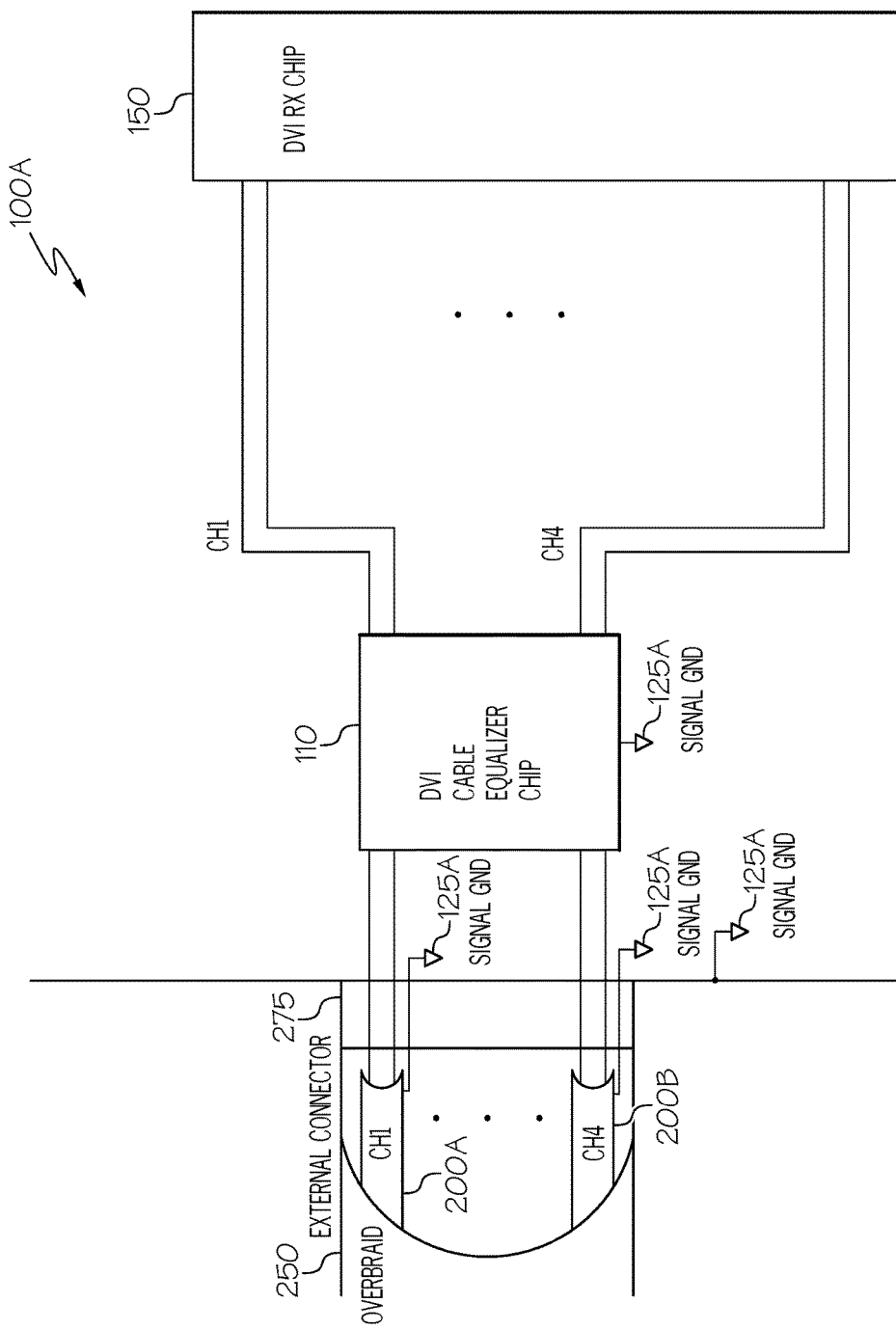
FIG. 1 illustrates a conventional DVI receiver.

Similar to the configuration shown in FIG. 1, after being processed by the DVI cable equalizer 110, the received DVI signals are conveyed to DVI receiver processing circuitry 150 for further processing for display. However, the configuration shown in FIG. 2 includes an isolating interface for coupling the signals from the DVI cable equalizer 110 to the DVI receiver processing circuitry 150. The DVI receiver processing circuitry is connected to the chassis signal ground 140. In the embodiment shown in FIG. 2, the isolating interface includes transformers 130A and 130B for magnetically coupling DVI signals to the DVI receiver processing circuitry 150. The parameters of the transformers 130A and 130B are chosen to meet signal band pass requirements. Also included in this configuration are capacitors and inductors, the inductors connected in series with resistors. The values of the capacitors, inductors and resistors are chosen based on signaling requirements.

The output of the isolated DC/DC converter 120 is connected to a DVI isolated ground 125B. In addition, the individual shields of the twisted pair cables 200A and 200B and the DVI cable equalizer 110 are connected to the DVI isolated ground 125B, while the DVI receiver processing circuitry 150 is connected to the chassis signal ground 140. Thus, the transformers 130A and 130B isolate the DVI signals fed to the DVI receiver processing circuitry 150 from the rest of the DVI receiver 100B, and the DC/DC converter 120 isolates the power fed to the DVI cable equalizer 110 from the rest of the DVI receiver 100B. Although not shown, an internal shield, which connects to the DVI Isolated Ground 125B and encloses the DVI Cable equalizer 110 and all circuitry referenced to the DVI Isolated Ground, may be provided for additional isolation.

Although the interface shown magnetically couples the DVI signal from the equalizer to the DVI receiver processing circuit 150, it should be appreciated that a capacitively coupling interface or optically coupling interface may be used. Further details of optical coupling are provided in U.S. Pat. No. 8,829,479, herein incorporated by reference.

The configuration shown in FIG. 2 forces the DVI return currents down the shields of the twisted pairs 200A and 200B, and the return currents do not split with the over-braid shield 250. This results in a reduction in electromagnetic emissions.

The invention presented complies with commercial DVI standards and does not require any changes to the transmitter end of the link or standard cable interface design. By creating an isolated receiver at the load end of the link and referencing this circuitry to the source or transmitting end, the DVI interface is in compliance with the commercial DVI standard. The invention results in EMI reduction which is useful not only for conventional commercial applications but also for vehicle applications having more stringent electromagnetic compatibility requirements than FCC part 15, e.g., aerospace applications, with maintained compliance with commercial DVI interface standards.

In addition to minimizing EMI, the invention minimizes the effects of transients, such as lightning. By connecting the over-braid shield 250 to the equipment chassis and aircraft structure at both ends, and by isolating the DVI receiver processing circuitry 150, the currents induced by transients, such as lightning, are primarily confined to the over-braid shield 250. This minimizes the effects of lightning and other transients on the DVI signal. The common-mode voltage induced across the individual DVI signal twisted pair cables is reduced, and the current induced in the twisted pair cables is minimized. Instead, the majority of the induced transient voltage appears between the isolated DVI signal reference and the equipment chassis. This results in a much reduced common-mode voltage presented to the DVI transmitter or receiver in comparison to the voltages which would be presented with the DVI receiver reference to the equipment chassis and the aircraft structure.

Figure 3:
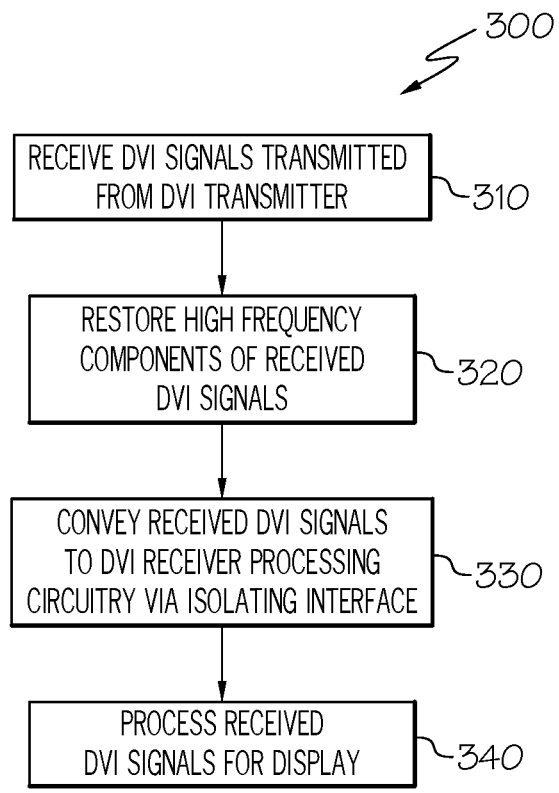
FIG. 3 illustrates a method for processing a received DVI signal according to an illustrative embodiment.

FIG. 3 illustrates a method 300 for processing a received DVI signal according to an illustrative embodiment. It should be understood that the steps or other interactions of the illustrated method are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims.

Referring to FIG. 3, DVI signals are received at step 310 from a DVI transmitter via shielded twisted pair cables, e.g., twisted pair cables 200A and 200B surrounded by an over-braid shield 250 which is connected to a chassis ground. The received DVI signals are processed, e.g., by a DVI cable equalizer 110, to restore high frequency components that may have been attenuated during gransmission at step 320. At step 330, the received signals are conveyed or coupled to DVI receiver processing circuitry 150 via an isolating interface including, e.g., transformers 130A and 130B. At step 330, the DVI receiver processing circuitry 150 processes the received DVI signals for display. Such processing may including techniques and method known to those skilled in the art.

Although the description above and accompanying illustrations are directed to a Digital Visual Interface (DVI) and a DVI receiver, it should be appreciated that the concepts described herein and illustrated in the attached drawings are also applicable to other types of digital video interfaces and receivers, e.g., a High Definition Multimedia Interface (HDMI), a DisplayPort, and any digital video interface that requires inner shielded cables to be the current return path for the digital video link to operate properly.

While the claimed invention has been shown and described in example forms, it will be apparent to those skilled in the art that many modifications, additions, and deletions can be made therein without departing from the spirit and scope of the invention as defined by the following claims.

What is claimed is:

1. A digital video interface receiver, comprising:
   an input receiving digital video signals transmitted from a transmitter via a digital video interface including shielded twisted pair cables, wherein the twisted pair cables are surrounded by an over-braid shield which is connected to a chassis ground;
   receiving processing circuitry adapted to process the received digital video signals for display;
   an interface configured to convey the received digital video signals from the input to the receiver processing circuitry; and
   an isolated ground, wherein the interface is connected to the isolated ground, thereby isolating the receiver processing circuitry, and individual shields of the twisted pair cables are also connected to the isolated ground, such that a return current is forced back through the twisted pair cable shields rather than the over-braid shield,
   wherein the cable over-braid shield is connected to the chassis ground at the receiver end and the transmitter end, and
   wherein connection of the isolated ground to the receiver processing circuitry and the twisted pair cable shields causes transient currents to be primarily confined to the over-braid shield.

2. The digital video interface receiver of claim 1, wherein the digital video interface includes at least one of a Digital Visual Interface, a High Definition Multimedia Interface, a DisplayPort, and any other digital video interface that benefits from the return current being forced through the twisted pair cable shields rather than the over-braid shield.

3. The digital video interface receiver of claim 1, wherein forcing the return current back through the twisted pair cable shields rather than the over-braid shield reduces electromagnetic emissions.

4. The digital video interface receiver of claim 3, wherein the electromagnetic emissions are reduced to comply with limits established for high-performance and/or safety-critical applications.

5. The digital video interface receiver of claim 4, wherein the high-performance and/or safety-critical applications include aerospace applications.

6. The digital video interface receiver of claim 1, wherein the interface is magnetically coupled to the receiver processing circuitry.

7. The digital video interface receiver of claim 1, wherein the interface is capacitively coupled to the receiver processing circuitry.

8. The digital video interface receiver of claim 1, wherein the interface is optically coupled to the receiver processing circuitry.

9. The digital video interface receiver of claim 1, wherein the cable over-braid shield is connected to the chassis ground at the receiver end and the transmitter end.

10. The digital video interface receiver of claim 1, further comprising a cable equalizer configured to restore high frequency components of the received digital video signals, wherein the received digital video signals are conveyed from the cable equalizer to the receiver processing circuitry via the interface.

11. A method, comprising:
receiving digital video signals from a transmitter via a digital video interface including shielded twisted pair cables, wherein the twisted pair cables are surrounded by an over-braid shield which is connected to a chassis ground;
conveying the received digital video signals, via an interface, to receiver processing circuitry, wherein the interface is connected to an isolated ground, thereby isolating the receiver circuitry, and individual shields of the twisted pair cables are also connected to the isolated ground, such that a return current is forced back through the twisted pair cable shields rather than the over-braid shield,
wherein the cable over-braid shield is connected to the chassis ground at the receiver end and the transmitter end,
wherein connection of the isolated ground to the receiver circuitry and the twisted pair cable shields causes transient currents to be primarily confined to the over-braid shield.

12. The method of claim 11, wherein the digital video interface includes at least one of a Digital Visual Interface, a High Definition Multimedia Interface, a DisplayPort, and any other digital video interface that benefits from the return current being forced through the twisted pair cable shields rather than the over-braid shield.

13. The method of claim 11, wherein forcing the return current back through the twisted pair cable shields rather than the over-braid shield reduces electromagnetic emissions.

14. The method of claim 13, wherein the electromagnetic emissions are reduced to comply with limits established for high-performance and/or safety-critical applications including aerospace applications.

15. The method of claim 11, wherein the interface is magnetically coupled to the receiver processing circuitry.

16. The method of claim 11, wherein the interface is capacitively coupled to the receiver processing circuitry.

17. The method of claim 11, wherein the interface is optically coupled to the receiver processing circuitry.

18. The method of claim 11, wherein the cable over-braid shield is connected to the chassis ground at the receiver end and the transmitter end.

19. The method of claim 11, further comprising processing the received digital video signals to restore high frequency components before conveying the received digital video signals to the receiver processing circuitry.

20. The method of claim 11, further comprising processing the received digital video signals for display.

* * * * *